United States Patent
Moon et al.

(10) Patent No.: US 11,538,360 B2
(45) Date of Patent: Dec. 27, 2022

(54) RFID TAG IN DISPLAY ADAPTER

(71) Applicant: Tactile Solutions, Inc., Lafayette, IN (US)

(72) Inventors: Alexander Moon, West Lafayette, IN (US); Thomas Baker, West Lafayette, IN (US); David A. Schleppenbach, Lafayette, IN (US)

(73) Assignee: Tactile Solutions, Inc., Lafayette, IN (US)

( * ) Notice: Subject to any disclaimer, the term of this patent is extended or adjusted under 35 U.S.C. 154(b) by 72 days.

(21) Appl. No.: 17/197,575

(22) Filed: Mar. 10, 2021

(65) Prior Publication Data

US 2021/0287568 A1     Sep. 16, 2021

Related U.S. Application Data

(60) Provisional application No. 62/987,388, filed on Mar. 10, 2020.

(51) Int. Cl.
  *G09B 21/00*   (2006.01)
  *G06F 16/38*   (2019.01)
  *G09B 21/02*   (2006.01)

(52) U.S. Cl.
  CPC ......... *G09B 21/004* (2013.01); *G06F 16/381* (2019.01); *G09B 21/005* (2013.01); *G09B 21/02* (2013.01)

(58) Field of Classification Search
  CPC ..... G06F 16/381; G09B 21/003; G09B 21/02; G09B 21/004; G09B 21/005
  See application file for complete search history.

(56) References Cited

U.S. PATENT DOCUMENTS

| | | | |
|---|---|---|---|
| 3,987,438 A | 10/1976 | Lindemueller et al. | |
| 4,586,904 A | 5/1986 | Chlumsky et al. | |
| 4,772,205 A | 9/1988 | Chlumsky et al. | |
| 9,734,731 B2 * | 8/2017 | Van Hees | G09B 21/00 |
| 9,965,974 B2 * | 5/2018 | Labbe | G09B 21/025 |
| 10,249,217 B2 * | 4/2019 | Moon | G09B 21/004 |
| 10,276,066 B2 * | 4/2019 | Azamfar | G09B 21/004 |
| 10,431,118 B2 * | 10/2019 | Shah | G09B 21/004 |
| 10,573,199 B2 * | 2/2020 | Abebe | G09B 21/02 |

(Continued)

FOREIGN PATENT DOCUMENTS

DE     19547942 A1     7/1997

OTHER PUBLICATIONS

International Patent Application No. PCT/US2021/021654 International Search Report and Written Opinion dated Jun. 2, 2021. 13 pages.

(Continued)

*Primary Examiner* — Vinh T Lam
(74) *Attorney, Agent, or Firm* — Woodard, Emhardt, Henry, Reeves & Wagner, LLP

(57) ABSTRACT

An adapter for a tactile display is disclosed. The adapter can be used with a tactile display, such as a display that presents braille characters, to change or modify what is presented to a user. In some embodiments, the braille dots which make up a braille character can be made smaller or larger; spaced closer together or further apart; have a different shape; and/or an image or non-braille characters can be presented to a user of the tactile display using the disclosed adapter.

15 Claims, 10 Drawing Sheets

(56) References Cited

U.S. PATENT DOCUMENTS

| | | | |
|---|---|---|---|
| 10,692,400 B2* | 6/2020 | Drake | G09B 21/004 |
| 10,909,882 B2* | 2/2021 | Kim | G09B 21/004 |
| 11,033,187 B2* | 6/2021 | Li | A61B 5/14535 |
| 11,145,223 B2* | 10/2021 | Califorrniaa | G09B 21/007 |
| 11,164,480 B2* | 11/2021 | Guenther | G09B 21/004 |
| 11,200,815 B2* | 12/2021 | White | G09B 21/004 |
| 11,210,960 B2* | 12/2021 | Treml | G09B 21/004 |
| 11,335,207 B2* | 5/2022 | Cohen | G09B 21/004 |
| 11,455,910 B2* | 9/2022 | Bailey | G09B 21/02 |
| 2008/0145822 A1* | 6/2008 | Bucchieri | G09B 21/04 434/114 |
| 2009/0035731 A1* | 2/2009 | Murphy | G09B 21/003 434/114 |
| 2009/0286211 A1 | 11/2009 | Eisenhardt et al. | |
| 2013/0088747 A1* | 4/2013 | AlSalman | H04N 1/00127 358/1.15 |
| 2017/0069227 A1* | 3/2017 | Dialameh | A61H 3/061 |
| 2017/0309203 A1* | 10/2017 | Kim | G09B 21/006 |
| 2018/0190151 A1* | 7/2018 | Seo | G09B 21/003 |
| 2018/0240362 A1* | 8/2018 | Abebe | G09B 21/002 |
| 2018/0336801 A1 | 11/2018 | Moon et al. | |
| 2020/0294419 A1* | 9/2020 | Belomoev | H04W 4/80 |
| 2021/0082313 A1* | 3/2021 | Shaikh | G09B 21/005 |
| 2021/0134183 A1* | 5/2021 | Moon | G06F 3/0393 |

OTHER PUBLICATIONS

The Library of Congress, "Braille Books and Pamphlets," Specification No. 800. Feb. 2008. 28 pages.

* cited by examiner

RFID TAG IN DISPLAY ADAPTER

CROSS REFERENCE TO RELATED APPLICATION

This application claims the benefit of U.S. Provisional Application No. 62/987,388 filed Mar. 10, 2020, which is hereby incorporated herein by reference in its entirety.

BACKGROUND

The present disclosure pertains generally to tactile displays. Several tactile displays have been developed and commercialized, but have significant shortcomings. The most prevalent of these devices use piezo electric actuators to move the tactile elements of the display. These piezo actuators are relatively expensive, fragile, slow to change states, require unsafe voltages to actuate, and are relatively large. The shortcomings of these tactile displays severely limit the number of moveable tactile elements that can be displayed on a device using the piezo technology. Additionally, current displays require maintenance in the form of annual cleaning of the display elements to maintain the functionality of the units. This cleaning is performed by technicians and is therefore time consuming and expensive. Thus, there is a need for improvement in this field.

SUMMARY

In certain embodiments, the present disclosure pertains to tactile displays and adapters therefor that can be used to change the size of tactile elements observed by a user, shape of tactile elements observed by a user, location, such as relative location or absolute location, of tactile elements presented to a user, and/or other aspects of tactile elements of a tactile display.

In one embodiment, a RFID tag and/or detector may be used to communicate information to and/or from a tactile display to and/or from a display adapter. In still other embodiments, a display adapter and tactile display may be communication by any suitable means such as electrical communication, communication over a serial communication port, such as a D-subminiature connector, USB connector, and/or parallel communication port.

In other embodiments, a RFID sensor and/or coil may be located in a tactile display itself, and/or a RFID tag or chip may be embedded or attached to a capture plate assembly or graphics adapter.

In still other embodiments, a RFID sensor and/or coil may be located in a capture plate assembly or graphics adapter and/or a RFID tag or chip may be embedded or attached to a tactile display.

Additional embodiments of the invention, as well as features and advantages thereof, will be apparent from the descriptions herein.

DETAILED DESCRIPTION

Figure 1:
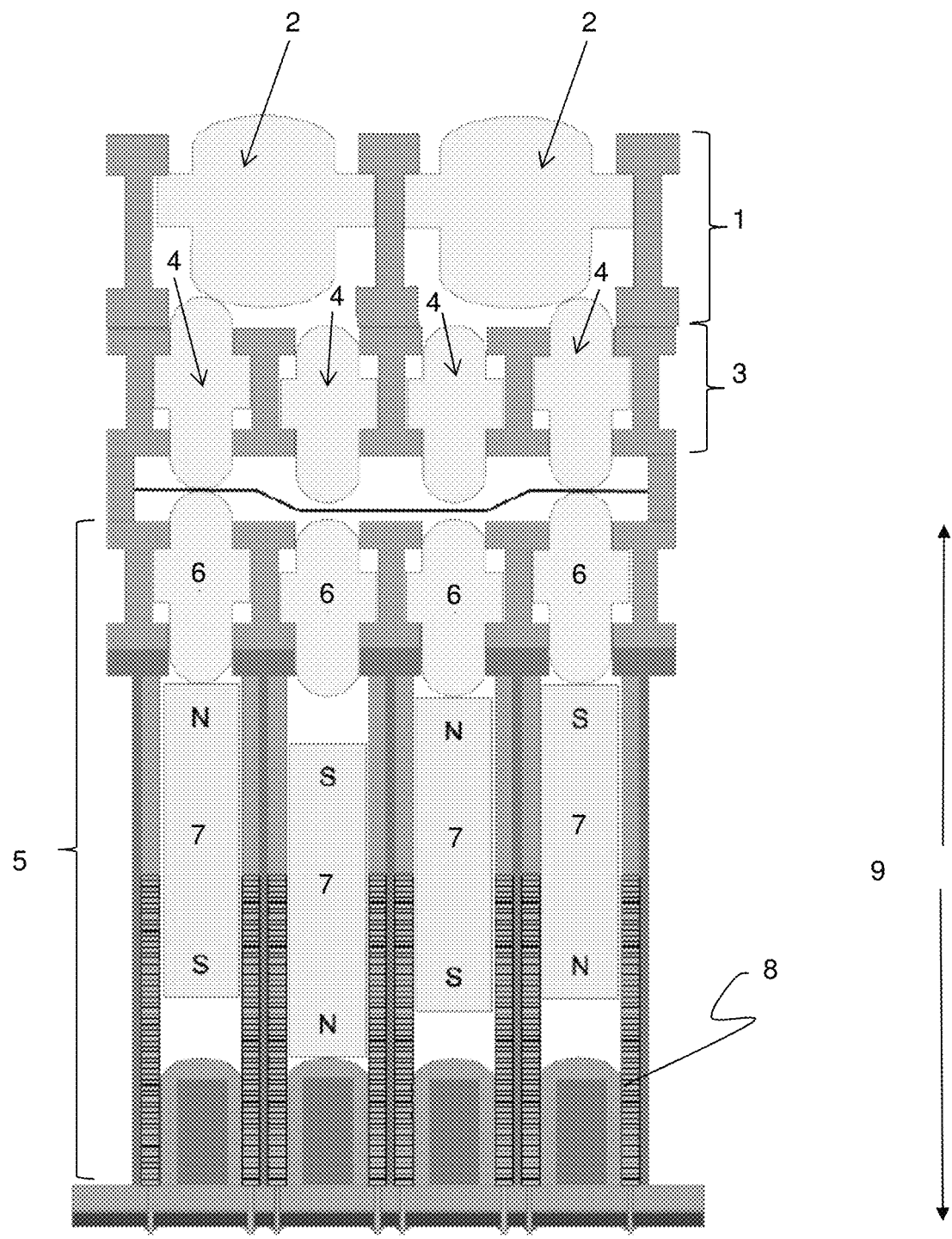
FIG. 1 shows a section view of one embodiment of the present disclosure where Graphic dots 2 of the adapter layer 1 reside above Braille dots 4 of the Brailler Layer 3, which resides above actuator 6 of the Actuator Layer 5 or modules 9. The position of actuator 6 are actuated by position of the permanent magnet 7.

For the purposes of promoting an understanding of the principles of the invention, reference will now be made to certain embodiments and specific language will be used to describe the same. It will nevertheless be understood that no limitation of the scope of the invention is thereby intended, such alterations and further modifications, and such further applications of the principles of the invention as described herein being contemplated as would normally occur to one skilled in the art to which the invention relates. Additionally, in the detailed description below, numerous alternatives are given for various features. It will be understood that each such disclosed alternative, or combinations of such alternatives, can be combined with the more generalized features discussed in the Summary above, or set forth in the embodiments described below to provide additional disclosed embodiments herein.

As used herein, when tactile elements are "presented" or "presented to a user", this term and/or phrase has its plain an ordinary meaning. For example, when a Braille character is presented to a user, tactile elements which form the Braille character may be raised or lowered so that the user can observe the raised elements and/or lack of raised elements within the character and thus identify the character being communicated.

Many countries and/or organizations have their own specification for how the sizing and spacing of Braille characters should be presented. For example, in the United States, Specification No. 800 titled "Braille Books and Pamphlets", incorporated by reference herein in its entirety, lays out the suggested nominal size and spacing of Braille dots in printed or embossed Braille pages. However, other countries or organizations may have different size and spacing preferences or requirements.

For example, Specification No. 800 states regarding the size of Braille dots that "[t]he nominal height of braille dots shall be 0.019 inches [0.48 mm] and shall be uniform within any given transcription" and "[t]he nominal base diameter of braille dots shall be 0.057 inches [1.44 mm]." Regarding the distance between Braille dots, Specification No. 800 states that "[t]he nominal distance from center to center of adjacent dots (horizontally or vertically, but not diagonally) in the same cell shall be 0.092 inches [2.340 mm]" and "[t]he nominal distance from center to center of corresponding dots in adjacent cells shall be 0.245 inches [6.2 mm]."

Therefore, it may be desirable to have a device or adapter which converts presentation of tactile information from one standard to another, for example from the U.S. Braille standard of Specification No. 800 to another form. For example, in certain embodiments, it may be desirable to present an image to the user of a tactile display.

In some embodiments, the tactile display of the present disclosure comprises more than one line of Braille text. For example, in one embodiment, the tactile display of the present disclosure may comprise 16 lines of Braille text, each line comprising 32 cells of Braille characters. In some embodiments, a Braille Character is comprised of 6 or 8 dots or tactile elements, per character.

In certain embodiments, the shape of tactile elements of the present disclosure can be, for example, generally round with the base of the tactile element having the cross-section of a circle. In other embodiments, tactile elements of the present disclosure can have it cross-section in the shape of a triangle, square, pentagon, hexagon, octagon, or any other suitable polygon. In some embodiments the sides of the tactile element come to a common point, can be rounded, or have another suitable geometry. In some embodiments the surface of the tactile element in the smooth, or may have a texture, for example but not limited to simulate the texture of paper or other substrate. In some embodiments, the adapter layer may be useful to alter the size, shape, and/or texture of tactile elements.

One aspect of the present disclosure relates to changing the size, shape, and/or texture of tactile elements that are presented to a user. For example, a tactile display may be comprised of an array one or more Braille characters comprising one or more tactile elements, and an adapter may be utilized so that the presentation of one or more Braille characters from a second array of tactile elements is different as compared to the first array of Braille characters comprising one or more tactile elements. For example, in one embodiment, the size, shape, and/or texture of the tactile elements of the second array of tactile elements can be different as compared to a first array of tactile elements.

In another embodiment, the presentation of a first array of tactile elements can be altered so as to display one or characters and/or numbers on a seven-segment display. Such a seven-segment display can be used for any purpose, for example, displaying the status of a device and/or displaying diagnostic information regarding a device.

In still another embodiment, a RFID tag and/or detector may be included in a tactile display or a display adapter. In one embodiment, a RFID tag and/or detector may be used to communicate information to and/or from a tactile display to and/or from a display adapter. In still other embodiments, a display adapter and tactile display may be communication by any suitable means such as electrical communication, communication over a serial communication port, such as a D-subminiature connector, Universal Serial Bus (USB) connector, and/or parallel communication port. In some embodiments, the universal serial bus communication port is a USB-A port, a USB-B port, a mini-USB port, a micro-USB port, a USB-C port. In still other embodiments, the communication protocol used for communication may be USB 1, USB 1.1, USB 2, USB 3, USB 3.1, or USB 3.2.

In other embodiments, a RFID sensor and/or coil may be located in a tactile display itself, and/or a RFID tag or chip may be embedded or attached to a capture plate assembly or graphics adapter.

In still other embodiments, a RFID sensor and/or coil may be located in a capture plate assembly or graphics adapter and/or a RFID tag or chip may be embedded or attached to a tactile display. The devices, articles of manufacture, and/or components thereof may be manufactured by any suitable means. For example, in certain embodiments one or more components may be manufactured by 3-D printing, injection molding, and/or by computer numerical control, sometimes referred to as "CNC" machines.

FIG. 1 shows one embodiment of the present disclosure, where adapter layer 1 is comprised of one or more graphics dots 2, which sits atop Braille layer 3 which is comprised of one or more Braille dots 4. The braille layer 3 sits atop the actuator layer 5, comprised of actuator 6, permanent magnets 7, metal coil 8. In this embodiment the graphics dots 2 from the Adapter Layer shown each sit above two of the braille dots 4 in the Braille Layer. In this way the larger graphic dots can be controlled by one or both of the smaller braille dots.

Figure 2:
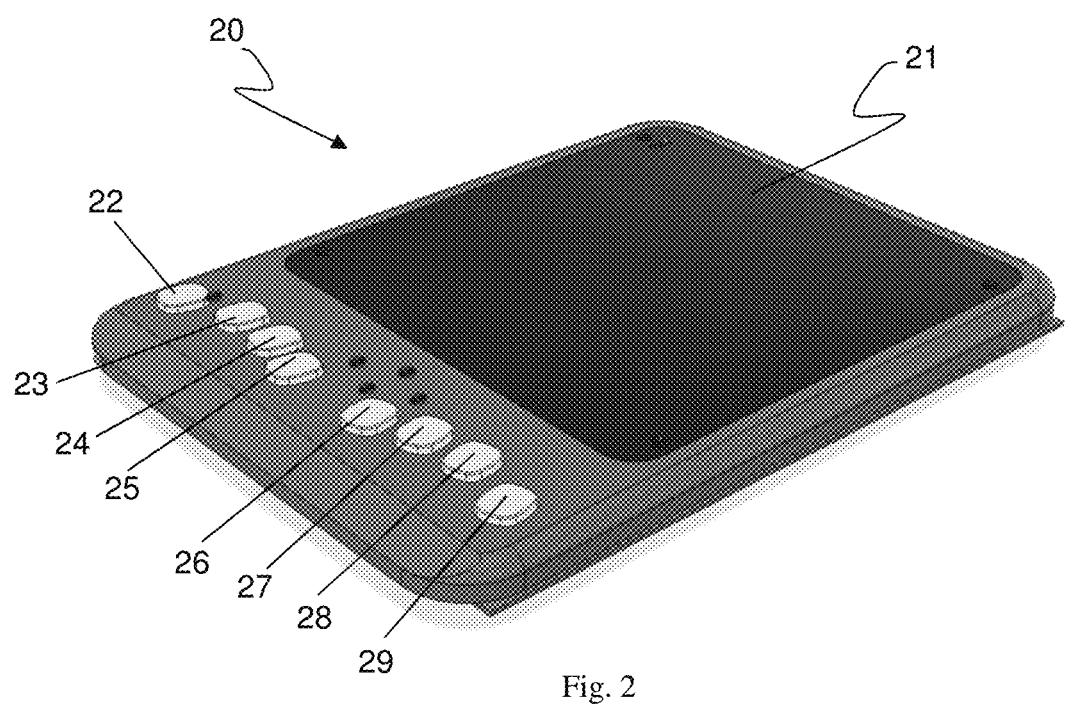
FIG. 2 shows one embodiment of a tactile display 20.

FIG. 2 shows one embodiment of a braille tablet 20. Braille tablet 20 includes surface 21 where various tactile elements may be displayed are presented to a user and also includes input keys 22, 23, 24, 25, 26, 27, 28, and 29. In this embodiment, the input keys 22-29 are arranged in a Perkins style 8-dot keyboard for Braille input. Surface 21 comprises a plane defining a plurality of openings for tactile elements to be raised above the surface of the plane and be observable by a user. In this way, the raised elements can present one or more Braille characters for a user to observe.

Figure 3:
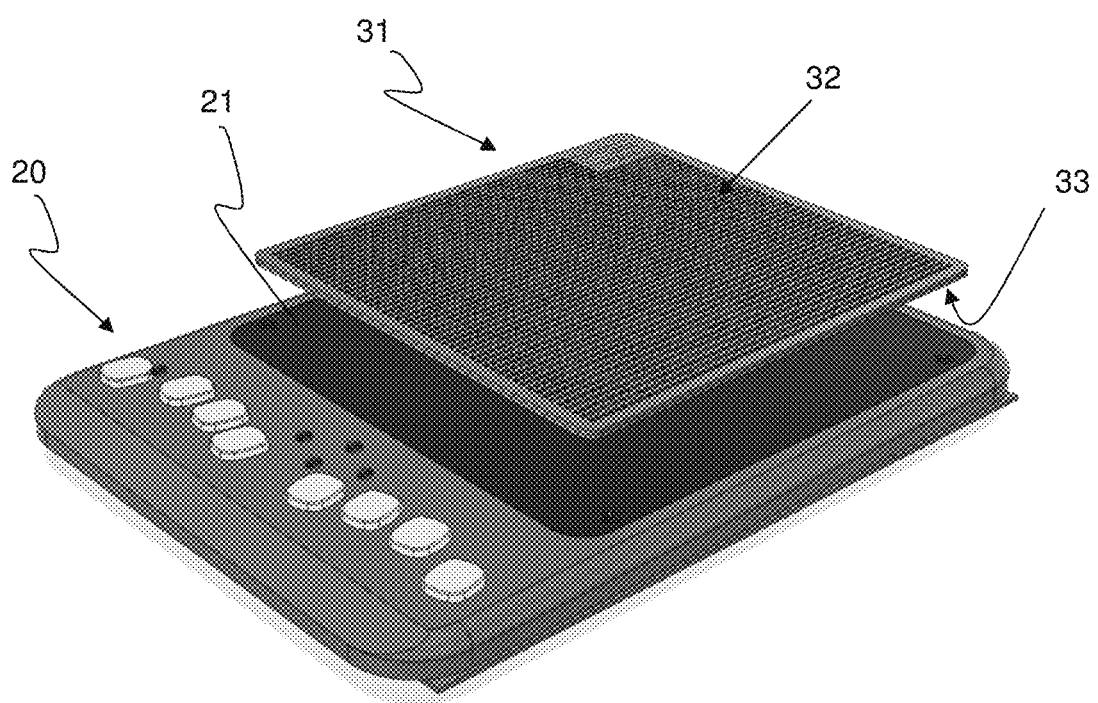
FIG. 3 shows an exploded view of one embodiment of a tactile display 20 and input keys further comprising a display adapter layer 31.

FIG. 3 shows an exploded view of the braille tablet 20 of FIG. 2 further comprising adapter 31 which sits above surface 21 and has a different arrangement of tactile elements which can be observed from face 32 as compared to surface 21 defining a plane. Face 33 abuts surface 21 so as to be in mechanical communication with the tactile elements observable from surface 21. In this way, when tactile elements are raised above the plane of surface 21 those tactile elements can affect the tactile elements residing within the adapter 31 for example, so that tactile elements can be raised above the plane of the face 32. The tactile elements residing within the adapter 31 may have a different size, shape, relative location, absolute location, and/or other differing aspects from the tactile elements observable from surface 21.

Figure 4:
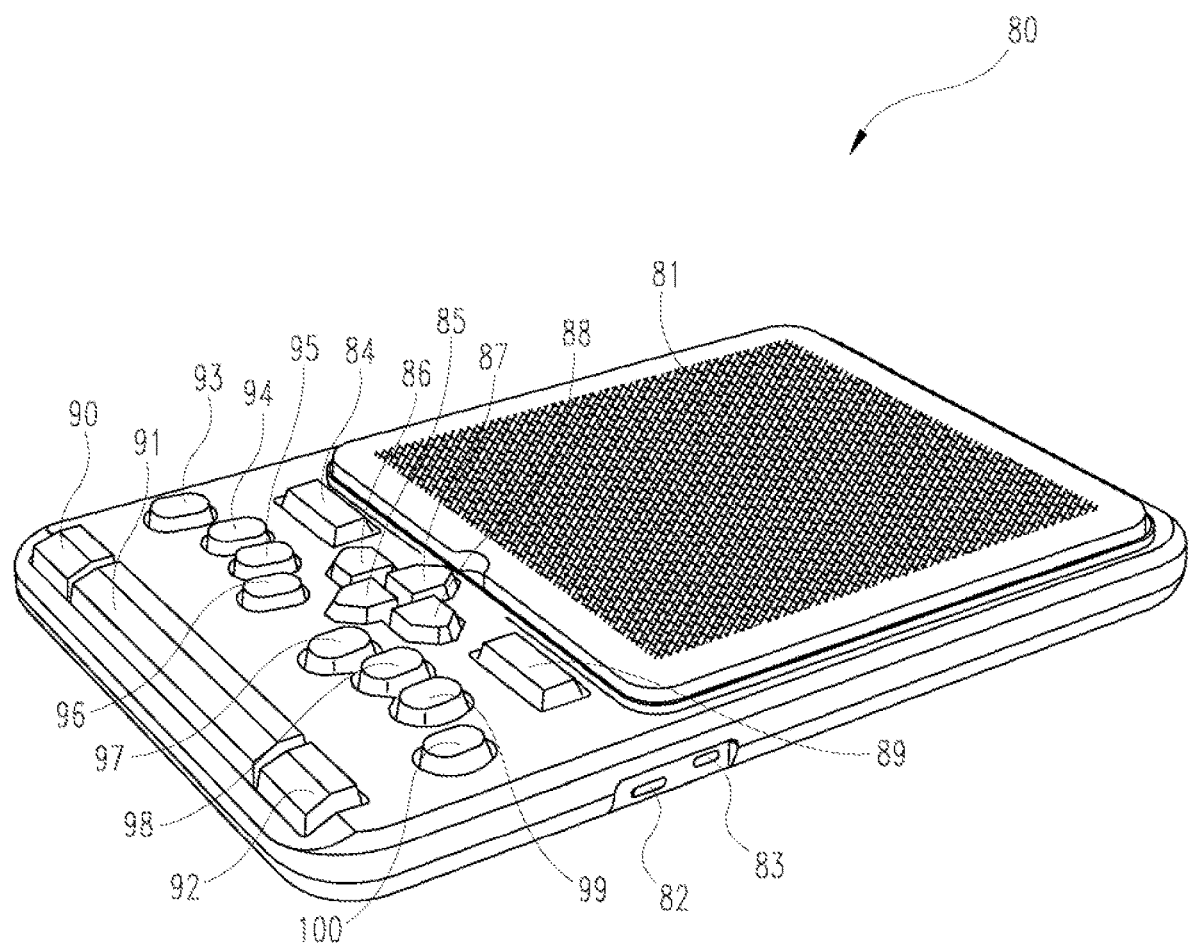
FIG. 4 shows one embodiment of a tactile display and input keys further comprising a display adapter.

FIG. 4 shows an embodiment of the present disclosure of tactile display 80 and adapter 81. Tactile display 80 comprises buttons 84, 85, 86, 87, 88, 89, 90, 91, 92, 93, 94, 95, 96, 97, 98, 99, 100, and 82. Tactile display 80 also comprises a jack 83 such as a USB jack for charging and/or data transfer to or from tactile display 80.

Figure 5:
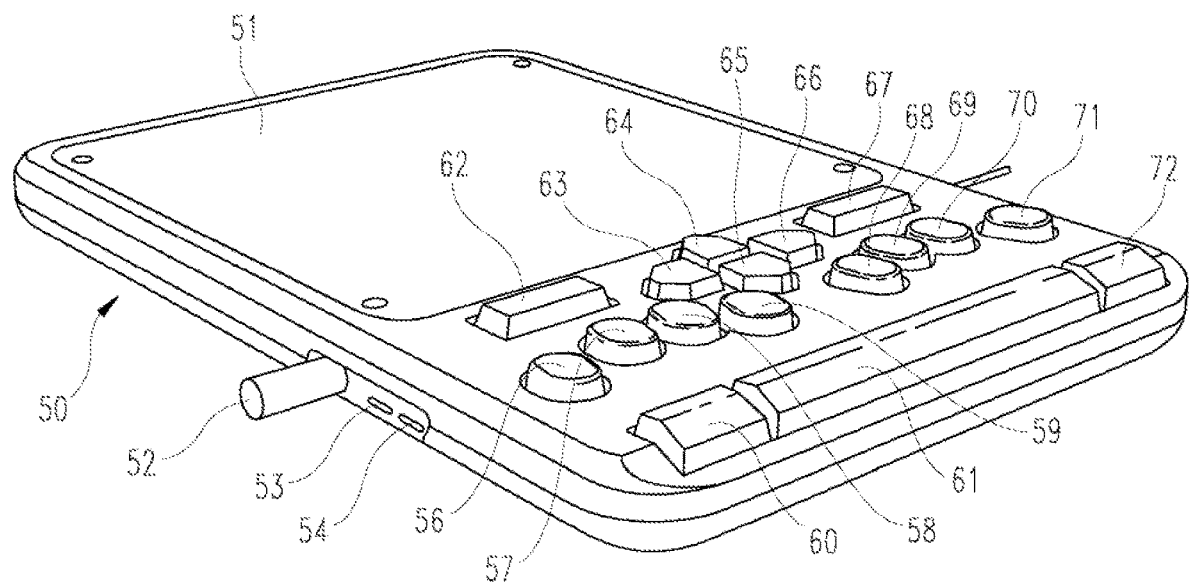
FIG. 5 shows one embodiment of a tactile display and input keys.

FIG. 5 shows an embodiment of the present disclosure including tactile display 50, comprising surface 51, buttons 62, 63, 64, 65, 66, 67, 56, 57, 58, 59, 60, 61, 68, 69, 60, 71, and 72. Surface 52 can define a plurality of openings where tactile elements can be raised above the plane of surface 51 to be observed by a user. Tactile elements raised above the plane of surface 51 can comprise Braille characters in some embodiments. Tactile display 50 also comprises headphone plug and/or jack 52, buttons 53 and 54 which may be used as a volume up and/or volume down button.

Figure 6:
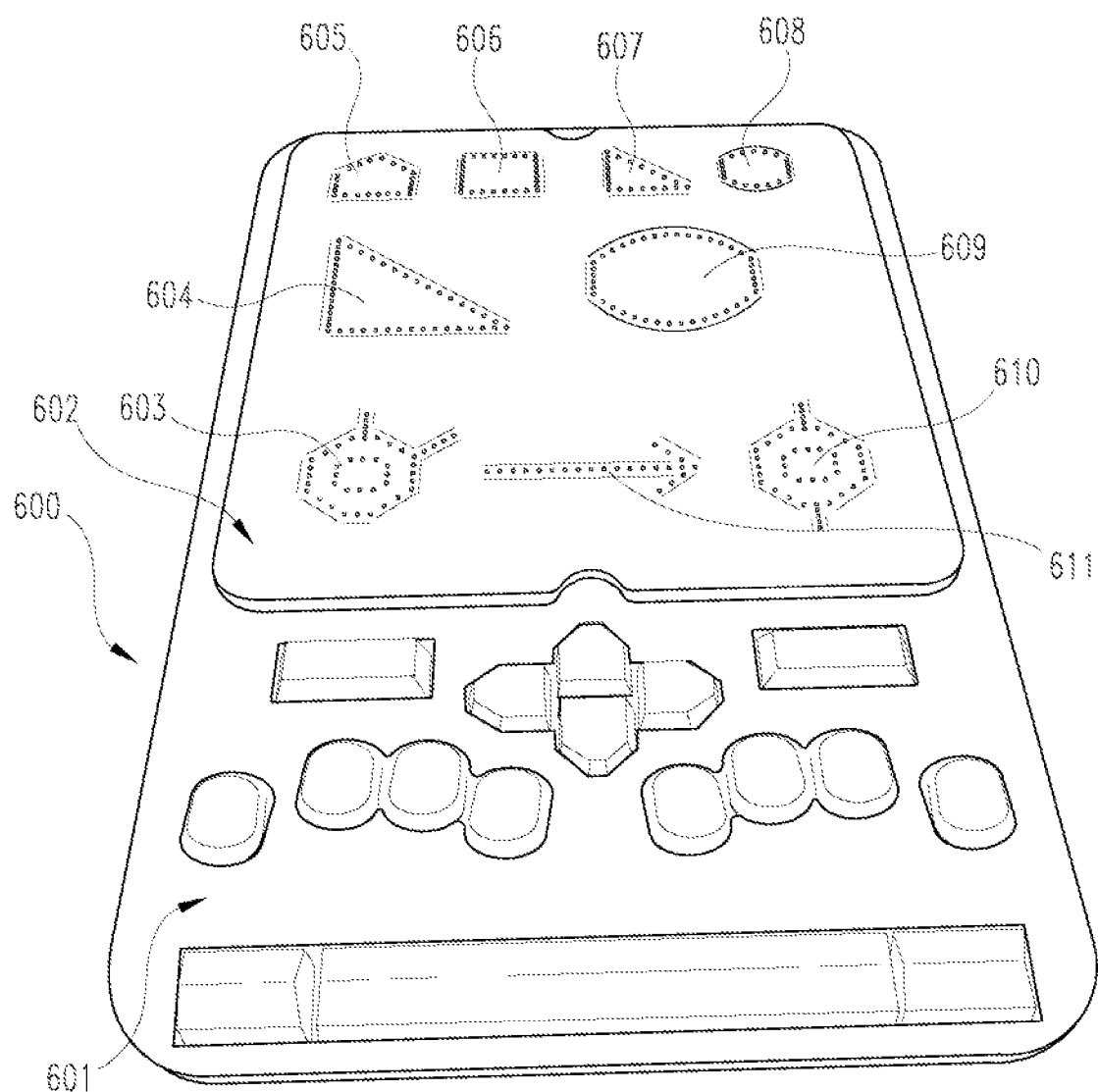
FIG. 6 shows a digital image of one embodiment of a display adapter with model tactile display.

FIG. 6 shows a digital image of one embodiment 600 of a display adapter with surface 602 and model tactile display 601. Shapes 603, 604, 605, 606, 607, 608, 609, 610, and 611 can be observed by raised tactile elements above surface 602.

Figure 7:
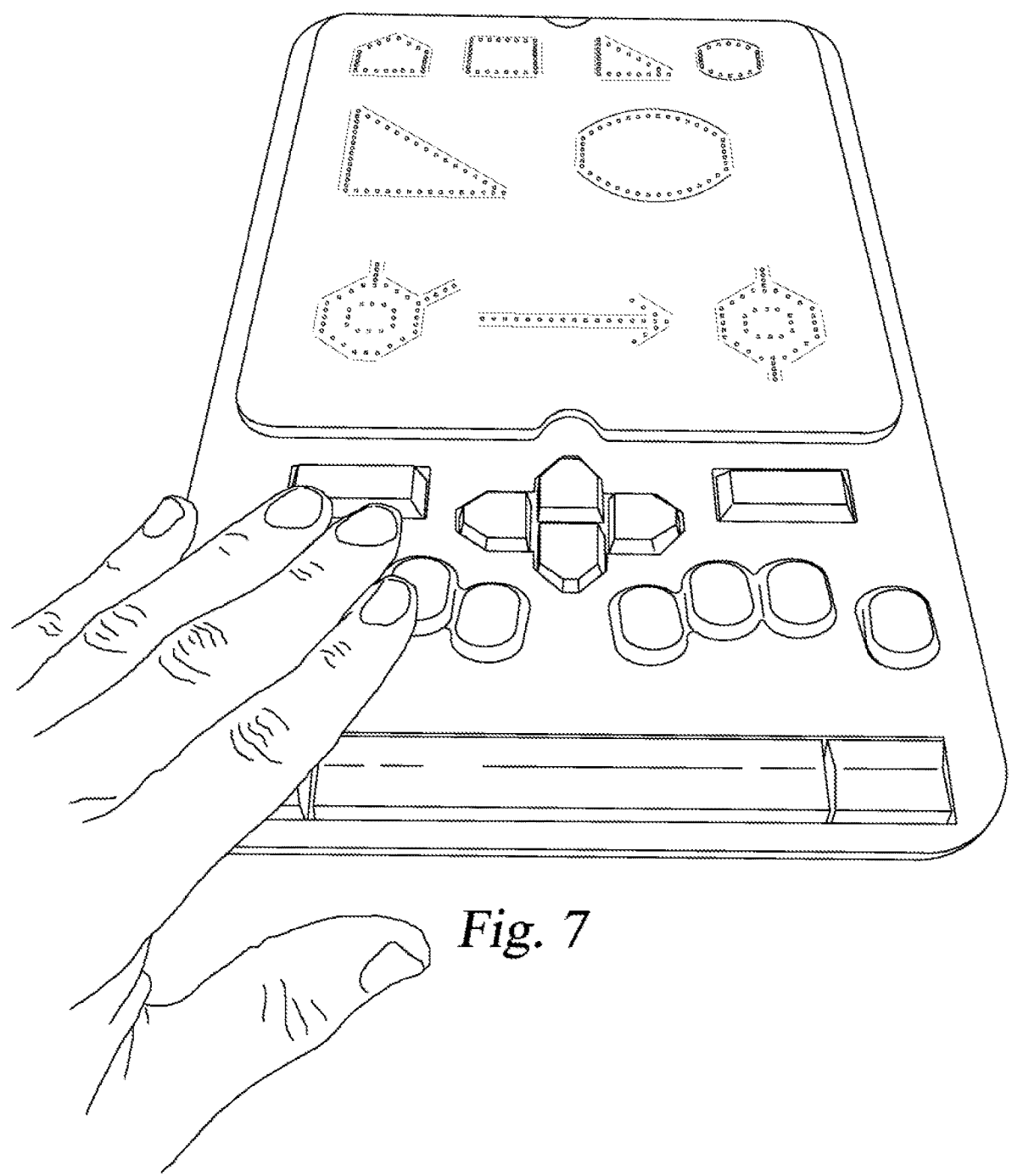
FIG. 7 shows a digital image of one embodiment of a display adapter with model tactile display and hand for reference and relative size.

FIG. 7 shows a digital image of one embodiment of a display adapter with model tactile display and hand for reference and relative size.

Figure 8:
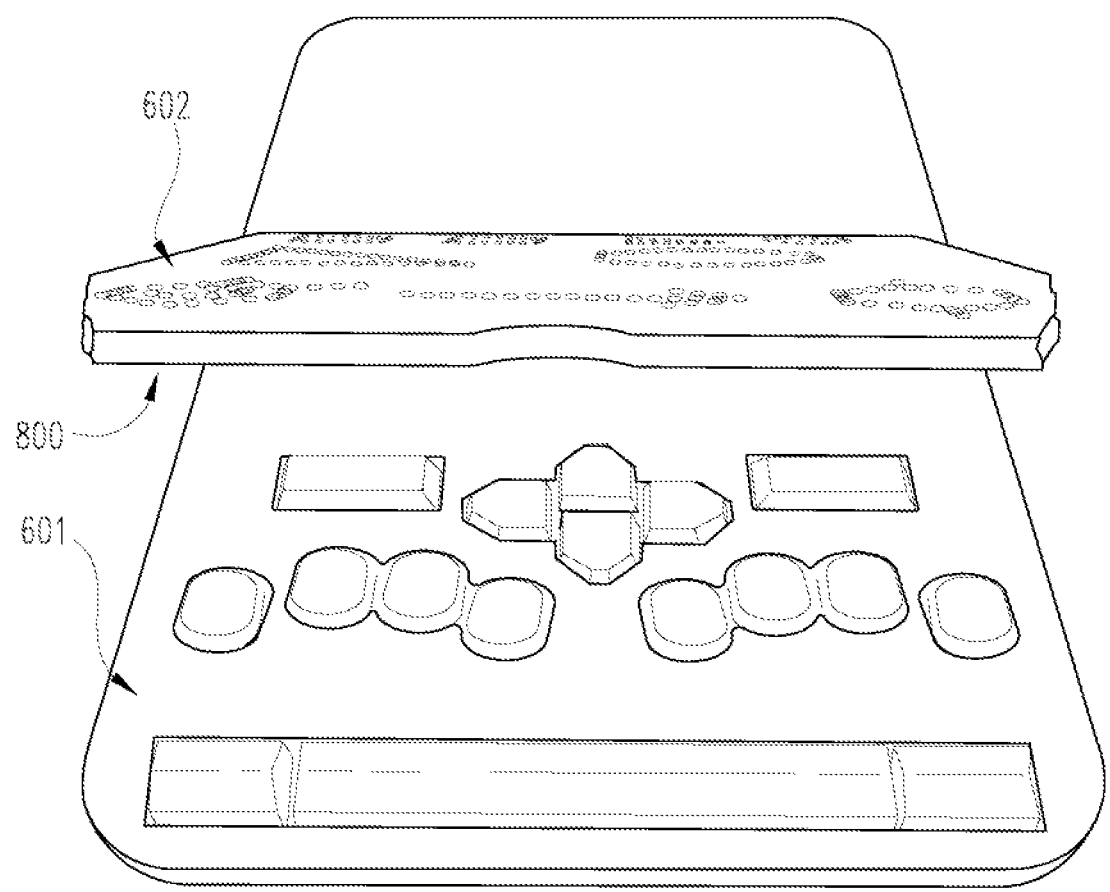
FIG. 8 shows a digital image of a side view of a display adapter with model tactile display in the background.

FIG. 8 shows a digital image of a side view of display adapter with face 602 and face 800 and model tactile display 601 in the background.

Figure 9:
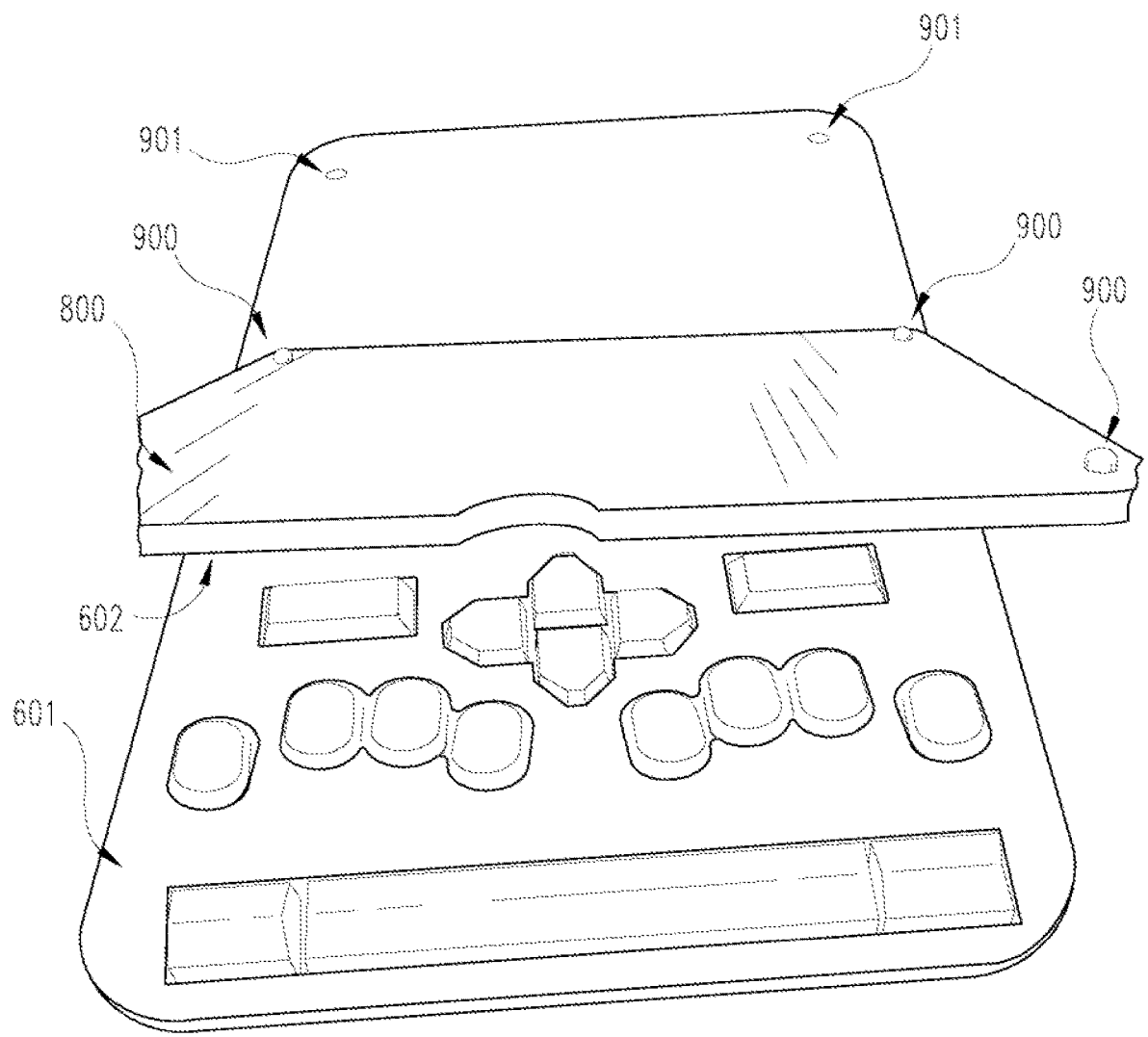
FIG. 9 shows a digital image of a side view of a display adapter with model tactile display in the background.

FIG. 9 shows a digital image of a side view of a display adapter with faces 602 and 800 and model tactile display 601. The display adapter has protrusions 900 from face 800 which allow the display adapter to be mechanically attached to the tactile display by fitting protrusions 800 into recessions 901.

Figure 10:
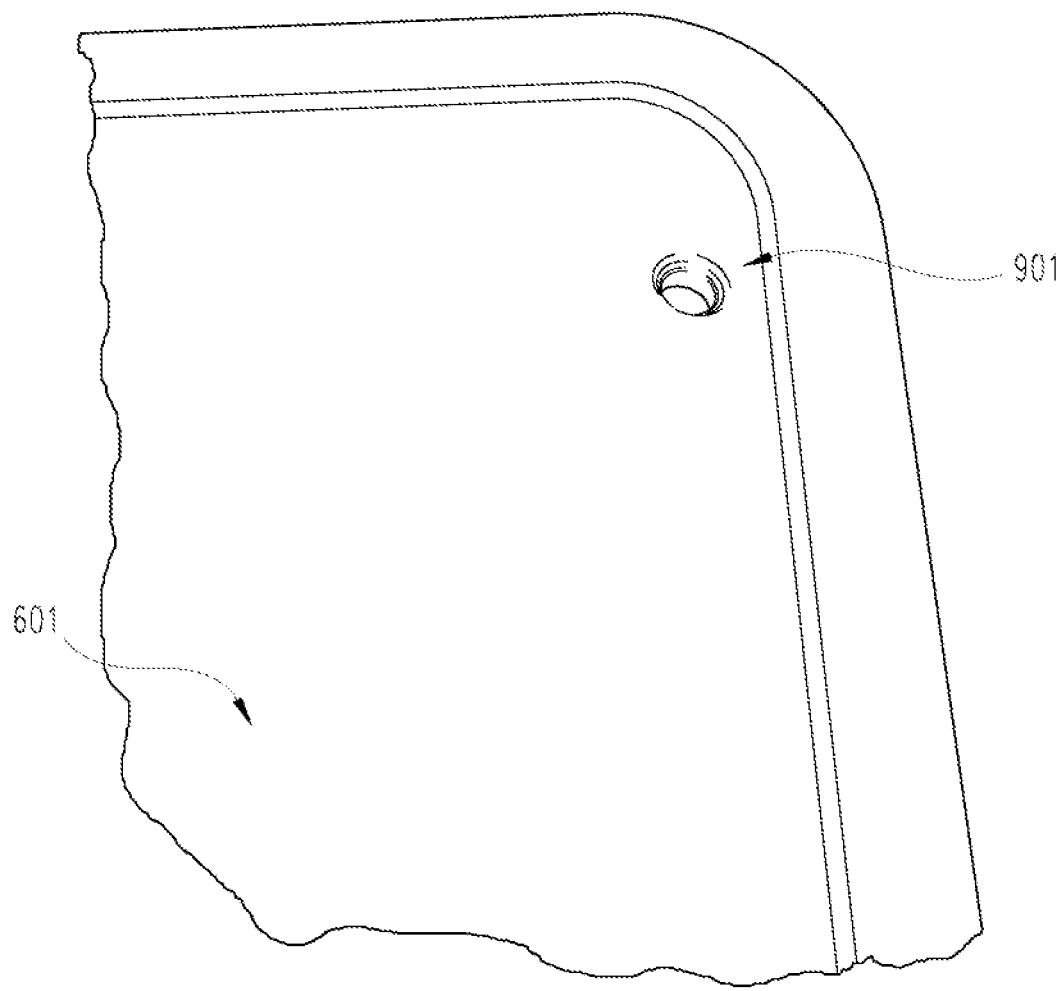
FIG. 10 shows a digital image of a close-up of a model tactile display and recess where display adapter can be attached to tactile display.

FIG. 10 shows a digital image close-up of model tactile display 601 and recession 901 which allows the display adapter to be mechanically attached to the tactile display.

The uses of the terms "a" and "an" and "the" and similar references in the context of describing the invention (especially in the context of the following claims) are to be construed to cover both the singular and the plural unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

While the invention has been illustrated and described in detail in the drawings and the foregoing description, the same is to be considered as illustrative and not restrictive in character, it being understood that only the preferred embodiment has been shown and described and that all changes and modifications that come within the spirit of the invention are desired to be protected. In addition, all references cited herein are indicative of the level of skill in the art and are hereby incorporated by reference in their entirety.

EMBODIMENTS

The following provides an enumerated listing of some of the embodiments disclosed herein. It will be understood that this listing is non-limiting, and that individual features or combinations of features (e.g., 2, 3 or 4 features) as described in the Detailed Description above can be incorporated with the below-listed Embodiments to provide additional disclosed embodiments herein.

1. An adapter suitable for modifying the presentation of one or more tactile elements from a first array of tactile elements to a user comprising:
   a housing defining an input side with and a presentation side, the input side defining a plurality of openings and the presentation side defining a plurality of openings;
   one or more tactile elements from a second array of tactile elements for presentation to a user on the presentation side of said housing; and
   wherein said input side of said housing is configured to be in mechanical communication between said one or more tactile elements from the first array of tactile elements and said one or more tactile elements from the second array of tactile elements.

2. The adapter of embodiment 1, wherein the size or shape of the one or more tactile elements of said second array of tactile elements is different as compared to the one or more tactical elements of the first array of tactile elements.

3. The adapter of embodiment 1, wherein the first array of tactile elements comprises two or more tactile elements.

4. The adapter of embodiment 1, wherein the second array of tactile elements comprises two or more tactile elements.

5. The adapter of embodiments 3 or 4, wherein the distance between the center of two tactile elements of the second array of tactile elements is different between the center of two tactile elements of the first array of tactile elements.

6. The adapter of any one prior embodiment, wherein the one or more tactile elements of the first array of tactile elements is suitable for being in a first raised position to become part of a braille character and a second position that does not serve as part of a braille character.

7. The adapter of any one prior embodiment, wherein the one or more tactile elements of the second array of tactile elements is suitable for being in a first raised position to become part of a braille character and a second position that does not serve as part of a braille character.

8. The adapter of any one prior embodiment, wherein the number of tactile elements in the first array of tactile elements is greater than the number of tactile elements in the second array of tactile elements.

9. The adapter of any one of embodiments 1-7, wherein the number of tactile elements in the first array of tactile elements is less than the number of tactile elements in the second array of tactile elements.

10. The adapter of any one of embodiments 1-7, wherein the number of tactile elements in the first array of tactile elements is equal to the number of tactile elements in the second array of tactile elements.

11. A method for altering the size, shape, absolute position, relative position, or texture of two or more tactile elements comprising the acts of:
   providing a first surface where two or more tactile elements from a first group of tactile elements can be observed;
   providing an adapter defining a second surface where one or more tactile elements of a second group of tactile elements can be observed;
   wherein the adapter is in mechanical communication with the one or more tactile elements from the first group of tactile elements that can be observed so that size, shape, absolute position, relative position, or texture of one or more tactile elements from the second surface is different from the size, shape, absolute position, relative position, or texture of the one or more tactile elements from the first surface.

12. The method of embodiment 11, wherein the tactile elements from the first surface are arranged to form Braille characters and the tactile elements from the second surface are spaced uniformly as measured from the center of each tactile element.

13. The adapter of any one of embodiments 1-10 comprising a communication port.

14. The adapter of embodiment 13, wherein the communication port is a USB-A port, a USB-B port, a mini-USB port, a micro-USB port, a USB-C port.

15. The adapter of any one of embodiment 1-10 further comprising a RFID tag or RFID reader.

What is claimed is:
1. An adapter suitable for modifying the presentation of one or more tactile elements within a braille layer of a tactile display to a user comprising:

a housing defining an input side with and a presentation side, the input side defining a plurality of openings and the presentation side defining a plurality of openings;

one or more tactile elements within an adapter layer of the tactile display for presentation to a user on the presentation side of said housing; and wherein said input side of said housing is configured to be in mechanical communication between said one or more tactile elements within the braille layer and said one or more tactile elements within the adapter layer.

2. The adapter of claim 1, wherein the size or shape of the one or more tactile elements within the adapter layer is different as compared to the one or more tactical elements within the braille layer.

3. The adapter of claim 1, wherein the braille layer comprises two or more tactile elements.

4. The adapter of claim 1, wherein the adapter layer comprises two or more tactile elements.

5. The adapter of claim 3, wherein the distance between the center of two tactile elements within the adapter layer is different between the center of two tactile elements within the braille layer.

6. The adapter of claim 1, wherein the one or more tactile elements within the braille layer is suitable for being in a first raised position to become part of a braille character and a second position that does not serve as part of a braille character.

7. The adapter of claim 1, wherein the one or more tactile elements within the adapter layer is suitable for being in a first raised position to become part of a braille character and a second position that does not serve as part of a braille character.

8. The adapter of claim 1, wherein the number of tactile elements within the braille layer is greater than the number of tactile elements within the adapter layer.

9. The adapter of claim 1, wherein the number of tactile elements within the braille layer is less than the number of tactile elements within the adapter layer.

10. The adapter of claim 1, wherein the number of tactile elements within the braille layer is equal to the number of tactile elements within the adapter layer.

11. A method for altering the size, shape, absolute position, relative position, or texture of two or more tactile elements comprising the acts of:

providing a first surface where two or more tactile elements within a braille layer of a tactile display can be observed;

providing an adapter defining a second surface where one or more tactile elements within an adapter layer of the tactile display can be observed;

wherein the adapter is in mechanical communication with the one or more tactile elements from the braille layer that can be observed so that size, shape, absolute position, relative position, or texture of one or more tactile elements from the second surface is different from the size, shape, absolute position, relative position, or texture of the one or more tactile elements from the first surface.

12. The method of claim 11, wherein the tactile elements from the first surface are arranged to form Braille characters and the tactile elements from the second surface are spaced uniformly as measured from the center of each tactile element.

13. The adapter of claim 1 comprising a communication port.

14. The adapter of claim 13, wherein the communication port is a USB-A port, a USB-B port, a mini-USB port, a micro-USB port, or a USB-C port.

15. The adapter of claim 1 further comprising a RFID tag or RFID reader.

* * * * *